United States Patent
Zheng et al.

(10) Patent No.: US 11,874,862 B2
(45) Date of Patent: Jan. 16, 2024

(54) COMMUNITY QUESTION-ANSWER WEBSITE ANSWER SORTING METHOD AND SYSTEM COMBINED WITH ACTIVE LEARNING

(71) Applicant: XI'AN JIAOTONG UNIVERSITY, Xi'an (CN)

(72) Inventors: Qinghua Zheng, Xi'an (CN); Ruoqing Ren, Xi'an (CN); Jun Liu, Xi'an (CN); Hongwei Zeng, Xi'an (CN); Kunming Ma, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 0 days.

(21) Appl. No.: 17/955,584

(22) Filed: Sep. 29, 2022

(65) Prior Publication Data
US 2023/0035338 A1 Feb. 2, 2023

Related U.S. Application Data

(63) Continuation of application No. PCT/CN2021/116051, filed on Sep. 1, 2021.

(30) Foreign Application Priority Data

Nov. 9, 2020 (CN) .......................... 202011240697.1

(51) Int. Cl.
*G06F 16/00* (2019.01)
*G06F 16/332* (2019.01)
(Continued)

(52) U.S. Cl.
CPC ........ *G06F 16/3329* (2019.01); *G06F 16/338* (2019.01); *G06F 16/3344* (2019.01);
(Continued)

(58) Field of Classification Search
CPC ............ G06F 16/3329; G06F 16/3344; G06F 16/3347; G06F 16/338; G06F 16/9536;
(Continued)

(56) References Cited

U.S. PATENT DOCUMENTS 9,817,897 B1 * 11/2017 Wang .................. G06F 16/3329
11,055,355 B1 * 7/2021 Monti ............... G06F 16/90332
(Continued)

FOREIGN PATENT DOCUMENTS

CN 110321421 A 10/2019
CN 112434517 A 3/2021

OTHER PUBLICATIONS

International Search Report (PCT/CN2021/116051); dated Nov. 25, 2021.
Re-ranking-model-for-implicit-spam-answers-in-CQA.

*Primary Examiner* — Noosha Arjomandi
(74) *Attorney, Agent, or Firm* — W&G Law Group

(57) ABSTRACT

A community question-answer (CQA) website answer sorting method and system combined with active learning. The sorting method comprises: step S1, performing question-answer data representation and modeling; and step S2, constructing a training set in combination with active learning, and predicting a sorting relationship of candidate question-answer pairs. Also provided is a community question-answer website answer sorting system combined with active learning. CQA website question-answer data is first represented and modeled, interference to answers sorting caused by long tail distribution of the community data is solved by means of a long tail factor, and an attention mechanism is introduced in a convolutional neural network to relieve a semantic gap problem among question-answer texts. Then, an unlabeled training set is also constructed, a sample is additionally selected from the unlabeled training set and
(Continued)

labeled, and an answer sorting model is trained again after labeling results are merged.

10 Claims, 2 Drawing Sheets

(51) Int. Cl.
| | |
|---|---|
| *G06F 16/33* | (2019.01) |
| *G06F 16/338* | (2019.01) |
| *G06F 40/166* | (2020.01) |
| *G06F 40/30* | (2020.01) |
| *G06N 5/04* | (2023.01) |

(52) U.S. Cl.
CPC ........ *G06F 16/3347* (2019.01); *G06F 40/166* (2020.01); *G06F 40/30* (2020.01); *G06N 5/04* (2013.01)

(58) Field of Classification Search
CPC . G06F 16/3346; G06F 16/9538; G06F 16/958
See application file for complete search history.

(56) References Cited

U.S. PATENT DOCUMENTS

| | | | |
|---|---|---|---|
| 11,204,929 B2* | 12/2021 | Adderly | G06F 16/24578 |
| 11,210,341 B1* | 12/2021 | Bhagat | G06F 16/90335 |
| 11,321,329 B1* | 5/2022 | Shih | G06F 18/213 |
| 11,380,305 B2* | 7/2022 | Rajagopal | G10L 15/08 |
| 11,709,873 B2* | 7/2023 | Xiao | G06F 16/3347 |
| | | | 707/780 |
| 11,768,858 B2* | 9/2023 | Li | G06F 17/16 |
| | | | 713/340 |
| 2015/0056596 A1* | 2/2015 | Bercovitz | G09B 7/02 |
| | | | 434/350 |
| 2017/0161364 A1* | 6/2017 | Clark | H04L 67/306 |
| 2018/0067922 A1* | 3/2018 | Kawada | G06F 16/00 |
| 2019/0251087 A1* | 8/2019 | Lin | G06F 16/953 |
| 2021/0157845 A1* | 5/2021 | Dodel | G06N 3/08 |
| 2021/0201172 A1* | 7/2021 | Shen | G06N 20/00 |
| 2021/0240775 A1* | 8/2021 | Liu | G06F 16/9035 |
| 2021/0365500 A1* | 11/2021 | Gunaselara | G06F 16/951 |
| 2021/0365837 A1* | 11/2021 | Kashihara | G06F 16/358 |
| 2022/0121884 A1* | 4/2022 | Zadeh | G06V 10/764 |
| 2022/0391595 A1* | 12/2022 | Shevelev | G06N 3/08 |
| 2023/0023958 A1* | 1/2023 | Ferritto | G06F 16/3328 |
| 2023/0035338 A1* | 2/2023 | Zheng | G06N 5/041 |
| 2023/0036072 A1* | 2/2023 | Gao | G06N 5/022 |
| 2023/0186161 A1* | 6/2023 | Arthur | G06F 40/58 |
| | | | 704/2 |
| 2023/0205824 A1* | 6/2023 | Jablokov | G06F 16/3329 |
| | | | 707/737 |
| 2023/0252098 A1* | 8/2023 | Stewart | H04L 67/535 |
| | | | 707/770 |
| 2023/0302365 A1* | 9/2023 | Karp | A63F 13/533 |
| | | | 463/42 |

* cited by examiner

COMMUNITY QUESTION-ANSWER WEBSITE ANSWER SORTING METHOD AND SYSTEM COMBINED WITH ACTIVE LEARNING

CROSS-REFERENCE TO RELATED APPLICATIONS

The present application is a continuation of International Application No. PCT/CN2021/116051, filed on Sep. 1, 2021, which claims priority to Chinese Application No. 202011240697.1, filed on Nov. 9, 2020, the contents of both of which are incorporated herein by reference in their entireties.

TECHNICAL FIELD

The present disclosure relates to Internet technology, in particular to a community question-answer website answer sorting method and system combined with active learning.

BACKGROUND

Since the 21st century, the user-centered Web2.0 technology has developed rapidly, and Internet users have become users of the new era who have dual identities of network content consumers and network content producers. With the support of User Generate Content (UGC) for the Internet, users can share more complex and diverse information through the network. Based on this, Community Question-answer (CQA) websites came into being. A CQA website is an open knowledge and information exchange platform, which connects users with information needs and users who are willing to share their personal experience and knowledge together through natural language question-answer, so as to realize accurate and direct transmission of knowledge and information, and support users to express their attitude towards the question-answer data through likes, comments and other operations. From the emergence of the first CQA website "Yahoo! Answers" in 2005 to the continuous emergence of various Chinese and English CQA websites such as "stackexchange", "quora", "Zhihu", "Baidu know" nowadays, CQA websites have attracted a large number of users and become an important channel for users to obtain information and share experience and knowledge.

Since the development of CQ websites, the way users get information in the system has changed from asking questions directly to searching first. At the early stage of CQA website development, there was no question-answer data accumulation, and users with information needs usually chose to ask questions directly and wait for other users to answer. This method can directly obtain the information users need, but it usually takes a long time to wait, and even after a long time, there is no answer. In recent years, CQA websites have developed rapidly, accumulating a large amount of question-answer data, which contains many similar questions or even the same questions. Therefore, most users will first search the historical question-answer data of CQA websites based on their own questions before asking questions, and then ask questions when the retrieved historical question-answer data cannot meet the demand, thus reducing the waiting time and improving the experience. At present, the retrieval function of the mainstream CQA websites generally returns a list of similar questions to users, and sorts the answers to each similar question according to data such as likes and comments. This method can help users choose answers to a certain extent, but there are still some problems, such as browsing a large number of question-answer data and judging the good and bad of answers from different similar questions, which leads to cognitive overload of users and reduces their experience. Therefore, it is necessary to sort the answers of all similar questions in a unified way, and it has become a research hotspot to directly return the sorted answer list according to the user's search goal, that is, the answer sorting task of the CQA website, which can also be called a community question-answer task. However, the features of the question-answer data of a CQA website make it difficult to study the answer sorting method of the CQA website. First of all, the lengths of the question-answer texts on the CQA website are quite different, with few co-occurring words and sparse distribution. In addition, as a user-generated text, the answer text contains a lot of redundancy, noise and even error information, which aggravates the semantic gap between the question-answer texts and makes it difficult to model the texts. Secondly, works related to CQA websites generally introduce community features based on community data calculation, such as calculating the proportion of approvals of an answer based on the total number of approvals to all answers to a question, and calculating the average number of approvals to each answer based on the number of users' answers. This calculation can only ensure the accuracy of community features when the community data is large enough. However, in reality, the community data of a CQA website has a long tail distribution, and the community feature data of a large number of question-answer data are very small, which leads to the answer sorting model biased towards question-answer data with a large number of community features that cannot accurately reflect the true level of data. Finally, considering that the correct answer to a question in the CQA website is not unique, and the user's evaluation of a certain answer is based on the comparison with other candidate answers, it is more suitable to adopt a sorting method based on answer pairs, that is, the sorting problem of answers is converted into a series of two-class questions, and the sorting relationship between any two candidate answers in the target question is predicted. Compared with the sorting method based on a single answer that predicts the correlation between questions and answers, the sorting method based on answer pairs needs to label the sorting relationship between any two candidate answers when labeling the training set, and the scale of the training set increases and the labeling difficulty increases.

At present, in order to reduce the labeling cost of a training set, many domestic and foreign CQA websites adopt the sorting method based on a single answer, which directly models a question and each candidate answer, predicts the correlation between question and answers, and ignores the sorting relationship between answers in the CQA websites. Moreover, when the question-answer data of the CQA website are represented, the obvious semantic gap between the question-answer text data and the interference on the study caused by the long tail distribution of question-answer community data are taken into account.

SUMMARY

In view of the problems caused by the semantic gap between question-answer text data and long tail distribution of question-answer community data in CQA website answer ordering in the prior art, present disclosure provides a community question-answer website answer sorting method and system combined with active learning, so as to reduce the interference in the answer ordering process, the difficulty of text modeling and the cost of sample labeling.

In order to achieve the above purpose, the present disclosure has the following technical solution:

A community question-answer website answer sorting method combined with active learning, including the following steps:

S1, question-answer data representation and modeling: firstly, extracting text features of the question-answer data, and expressing a question title and answer content after word segmentation and stop word removal as a word vector matrix; then, calculating a community feature of the question-answer data based on community data related to question-answer, mapping a total number of approval answers to a question and a number of user answers to (0,1) through a question long tail factor and a user long tail factor, multiplying the community feature of the question-answer data by the question long tail factor and the user long tail factor to replace an original community feature of the question-answer data; finally, inputting the community feature of the question-answer data into a CQA-CNN (Community Question Answering-Convolutional neural network) model to represent the question-answer data as a distributed vector.

S2, constructing a training set by combining active learning and predicting a sorting relationship of candidate question-answer pairs: firstly, performing statistical analysis on a question-answer data set, formalizing a statistical result into rules, and automatically constructing a preliminary labeled training set based on the rules; then, constructing a answer sorting model based on the CQA-CNN model, and predicting a sorting relationship between any two candidate answers; finally, constructing an unlabeled training set, and selecting an additional sample from the unlabeled training set for manual labeling by combining active learning; merging labeled results into the preliminary labeled training set to retrain the answer sorting model, and using the answer sorting model after retraining for community question-answer website answer sorting.

Further, the present disclosure provides a community question-answer website answer sorting system combined with active learning, including:

A question-answer data representation module configured for extracting text features of the question-answer data, and expressing a question title and answer content after word segmentation and stop word removal as a word vector matrix; calculating a community feature of the question-answer data based on community data related to question-answer, mapping a total number of approval answers to a question and a number of user answers to (0,1) through a question long tail factor and a user long tail factor, multiplying the community feature of the question-answer data by the question long tail factor and the user long tail factor to replace an original community feature of the question-answer data, and inputting the community feature of the question-answer data into a CQA-CNN model to represent the question-answer data as a distributed vector.

A training set construction and answer sorting module configured for performing statistical analysis on a question-answer data set, formalizing a statistical result into rules, and automatically constructing a preliminary labeled training set based on the rules; constructing a answer sorting model based on the CQA-CNN model, and predicting a sorting relationship between any two candidate answers; constructing an unlabeled training set, and selecting an additional sample from the unlabeled training set for manual labeling by combining active learning; merging labeled results into the preliminary labeled training set to retrain the answer sorting model, and using the answer sorting model after retraining for community question-answer website answer sorting.

Compared with the prior art, the application has the following beneficial effects: firstly, the question-answer data of a CQA website is represented and modeled, the interference caused by the long tail distribution of community data to the answer ordering is solved by the long tail factor, and an attention mechanism is introduced into the convolutional neural network to alleviate the semantic gap between the question-answer texts; then, by combining active learning and answer sorting, an unlabeled training set is also constructed in addition to automatically constructing a labeled training set on the basis of rules, a sample is additionally selected from the unlabeled training set and labeled, and an answer sorting model is trained again after labeling results are merged, such that a model performance as high as possible can be obtained at a labeling cost as low as possible. The method can uniformly sort the candidate answers under the target questions in the CQA website.

DESCRIPTION OF EMBODIMENTS

Figure 1:
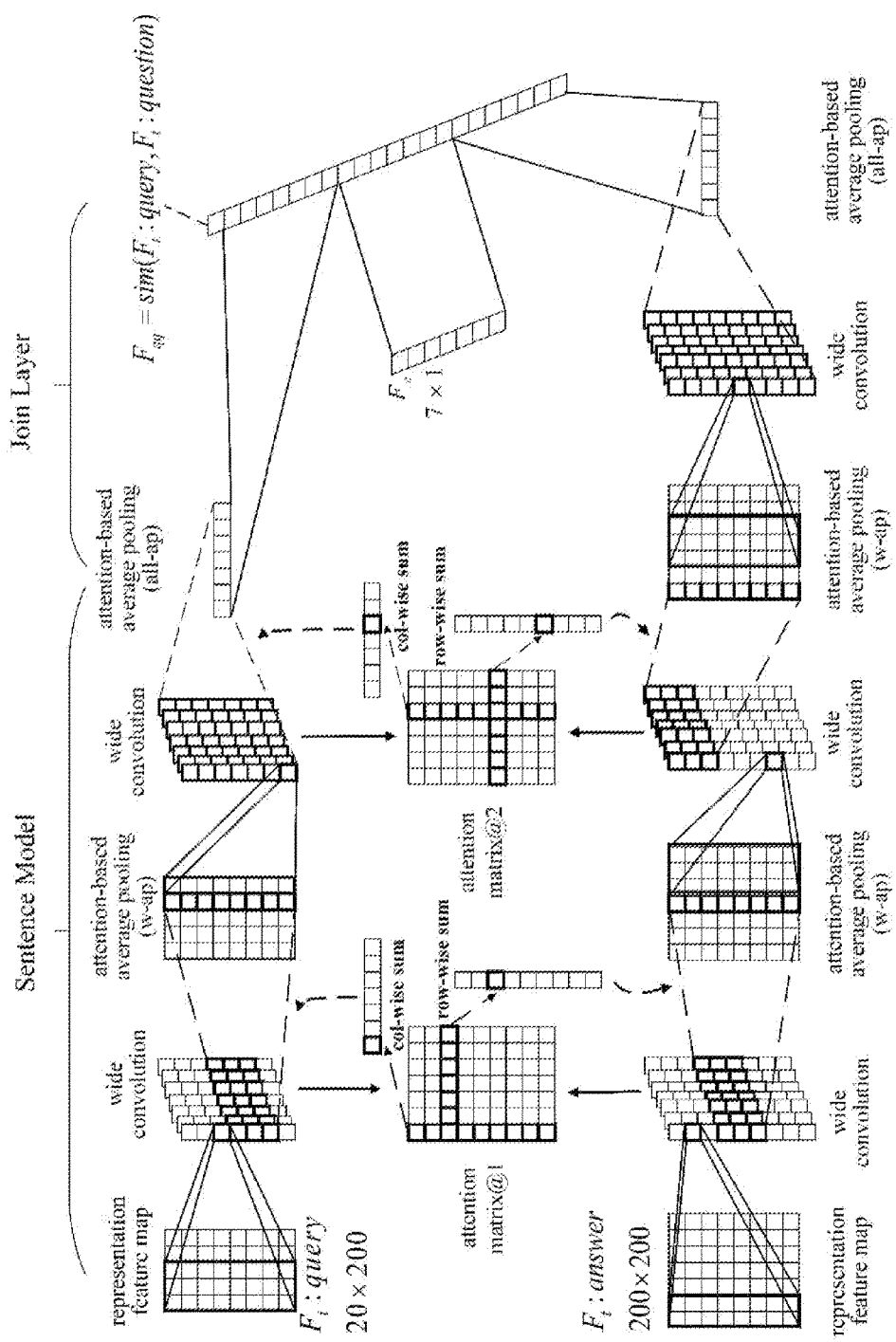
FIG. 1 is a schematic structural diagram of a CQA-CNN model of the present disclosure.
Figure 2:
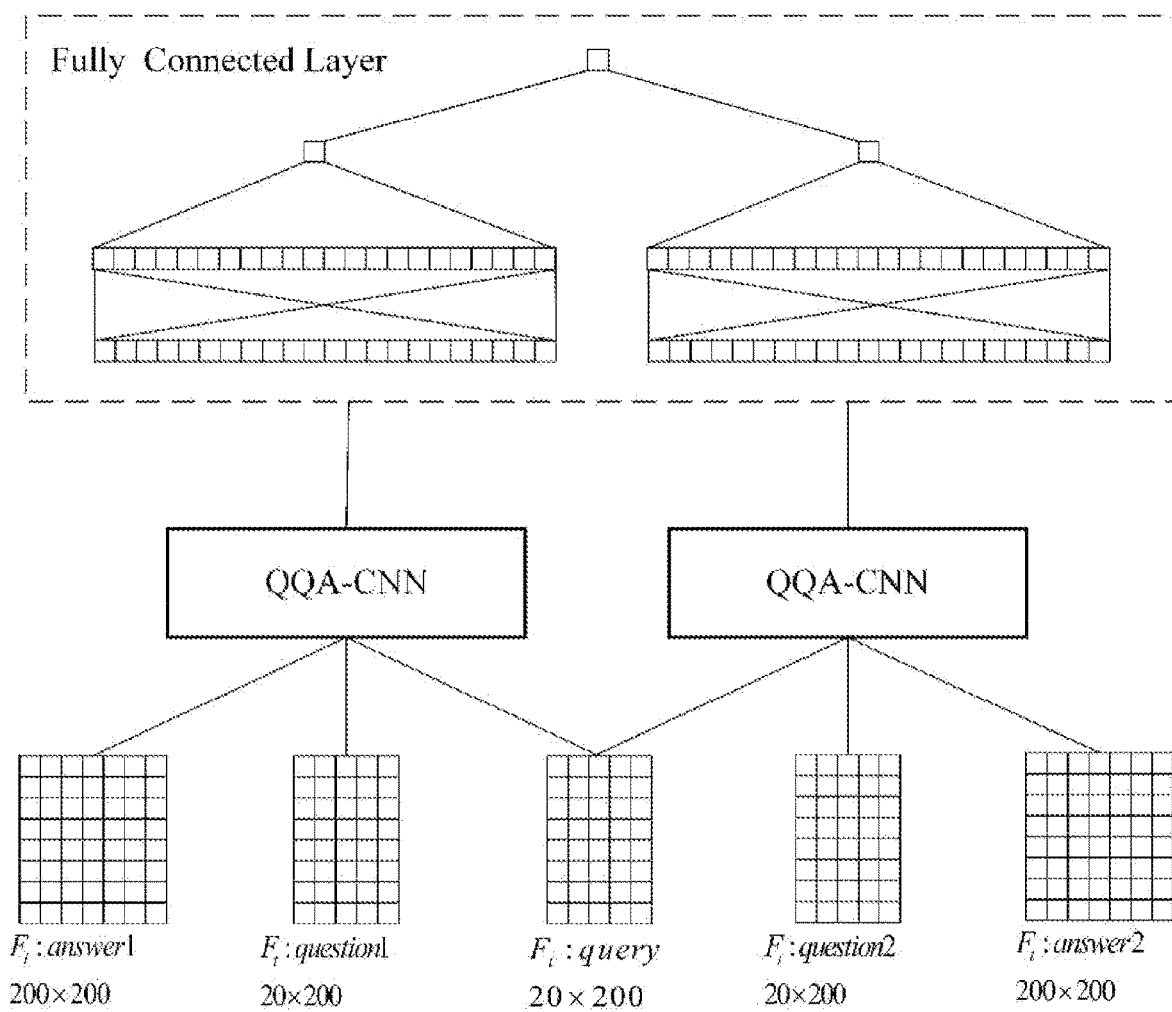
FIG. 2 is a structural diagram of an answer sorting model of the present disclosure.

The present disclosure will be further explained in detail with reference to the drawings.

The community question-answer website answer sorting method combined with active learning can be divided into the following two processes:

(1) Question-Answer Data Representation and Modeling, Including Three Steps;

Step 1, firstly, the title of a target question, the content of a candidate answer and the title of an original question corresponding to the candidate answer in the question-answer data are subjected to segmentation and stop word removal, and then texts are respectively expressed as word vector matrices by word2vec.

Step 2, the number of question answers, the proportion of approvals to an answer, the number of user answers, the average number of user approvals, the average number of user likes, the average number of user answer collections and the number of user followers are extracted as the community features of question-answer data.

The number of question answers refers to a total number of answers to a question; the number of user answers refers to a total number of answers provided by users in the website; the number of user followers refers to a total number of people who follows a user.

The proportion of approvals to an answer refers to a proportion of the number of approvals to the answer in a total number of all approvals to answers to the question; the proportion of approvals to an answer is calculated as follows:

$$avp_i^j = \frac{av_i^j}{\sum_{j=1}^{m_i} av_i^j} \quad (1)$$

where $avp_i^j$ indicates an approval proportion of an answer $a_i^j$; $av_i^j$ indicates the number of approvals to the answer $a_i^j$;

$$\sum_{j=1}^{m_i} av_i^j$$

indicates the sum of approvals of all answers to a question $q_i$; $m_i$ indicates the total number of answers to the question $q_i$.

The average number of user approvals, the average number of user likes and the average number of user answer collections respectively refer to the number of approvals, likes and collections of each answer of a user on average, which are calculated as follows:

$$uva_i = \frac{uvc_i}{uac_i} \quad (2)$$

$$ula_i = \frac{ulc_i}{uac_i} \quad (3)$$

$$uca_i = \frac{ucc_i}{uac_i} \quad (4)$$

where $uac_i$ indicates the number of answers of a user $u_i$; $uac_i$ indicates the total number of approvals to all answers of the user $u_i$, that is, the number of approvals of the user; $ula_i$ indicates the average number of likes of the user $u_i$; $ulc_i$ indicates the sum of likes obtained by all the answers of the user $u_i$, that is, the number of likes of the user.

Considering that the number of users' answers and the total number of approvals to the users' answers under a question in a community question-answer website have long tails, the total number of approvals to answers under most questions is very small, and the number of answers of most of users is very small. In order to reflect the difference between the total number of approvals to the answers and the number of user answers, a question long tail factor and a user long tail factor are put forward, and the calculation formulas are as follows:

$$q\_factor = \frac{1}{1 + e^{-(\omega_q \cdot qv_i - \phi_q)}} \quad (5)$$

$$u\_factor = \frac{1}{1 + e^{-(\omega_u \cdot uac_i - \phi_u)}} \quad (6)$$

where $qv_i$ indicates the sum of approvals to all the answers to the question $q_i$ that is $$qv_i = \sum_{j=1}^{m_i} av_i^j;$$

$m_i$ is the total number of answers to a question; $\omega_q=0.1$, $\phi=0.6$ both represent calculation parameters of the question long tail factor; $uac_i$ indicates the number of answers of the user $u_i$; $\omega_u=0.1$, $\phi_u=1$ both represent calculation parameters of the user long tail factor.

The question long tail factor and user long tail factor map the total number of approvals to the answers to a question and the number of user answers to (0,1), and replace community features by the result of multiplying community features by long tail factor, so as to balance the influence of long tail distribution of the data on the research.

Step 3, the target question, the candidate answers and the text features of an original question corresponding to the candidate answer and the community features related to question-answer data are input into the CQA-CNN model to obtain the distributed representation of question-answer data.

The structure of the CQA-CNN model includes a deep network for target questions, a deep network for candidate answers, and an attention mechanism module and a feature connection layer between the two deep networks; the deep network for target questions comprises two convolution layers and two pooling layers, and the deep network for candidate answers comprises three convolution layers and three pooling layers; two attention mechanism modules are respectively introduced into the CQA-CNN model before the two deep networks and between the two pooling layers, and finally high-level semantic features of target questions, high-level semantic features of candidate answers, community features and similarity features of the target questions and the candidate answers corresponding to original questions that are obtained from learning are connected in a feature connection layer, so as to obtain a representation of the question-answer data of a CQA website.

In the convolution layers, the CQA-CNN model adopts wide convolution to extract the semantic features of several consecutive words; in the pooling layers, the CQA-CNN model adopts two pooling strategies, i.e., partial pooling is adopted by the QA-CNN model for a middle pooling layer, that is, average pooling is implemented for features in a window of a certain length, and complete pooling is adopted by the QA-CNN model for the last pooling layer in the network, that is, average pooling is implemented for convolution results in a sentence length dimension; the attention mechanism module calculates an attention weight based on feature maps output by the convolution layers of the two deep models, and applies results to the pooling layers for weighted pooling; for the feature maps $F_q^c$ and $F_a^c$ obtained by the convolution layers of the text features of the target questions and candidate answers, an attention matrix A is calculated as follows:

$$A_{i,j} = \frac{1}{1 + |F_q^c[:,i] - F_a^c[:,j]|} \quad (7)$$

where |•| represents a Euclidean distance; in the attention matrix A, a sum of elements in each row and column is a weight of words.

A connection layer is added in the CQA-CNN after two deep neural networks to merge features for merging of features, including the high-level semantic features of target question texts, the high-level semantic features of candidate answer texts, community features related to the question-answer data, and cosine similarities of feature matrices of original question texts of the target questions and candidate answers, and finally, the question-answer data is represented as a distributed vector by the QA-CNN model.

(2) Construction of Training Set Combined with Active Learning and Prediction of Sorting Relationship Between Candidate Question-Answer Pairs, Including Three Steps.

Step 1, statistical analysis is carried out on the question-answer data set of the community question-answer website, and the results are formalized into rules so as to automatically construct a labeled training set.

After the statistical analysis on the question-answer data set, three rules are obtained and formalized; firstly, in the CQA website, under a same question, optimal answers are ranked higher than non-optimal answers; secondly, in the CQA website, under the same question, there is no difference in sorting order between non-optimal answers; finally, in the CQA website, the answers to questions in a same field as the target questions are ranked higher than those to questions in a different field from the target questions.

The above three rules are formalized as follows:

$$(q_i,(q_i,a_i^l)) \succ (q_i,(q_i,a_i^m)) \tag{8}$$

$$(q_i,(q_i,a_i^n)) \cong (q_i,(q_i,a_i^m)) \tag{9}$$

$$(q_i,(q_i,a_i^n)) \succ (q_i,(q_k,a_i^m)) \tag{10}$$

where $m \neq l$, $n \neq m$, and the symbol $\succ$ indicates that for the target question $q_i$, a candidate question-answer pair $(q_i, a_i^l)$ is ranked higher than a candidate question-answer pair $(q_i, a_i^m)$, that is, a sorting label is 1, and the symbol $\cong$ indicates that for the target question $q_i$, there is no sorting relationship between the candidate question-answer pair $(q_i, a_i^n)$ and the candidate question-answer pair $(q_i, a_i^m)$, that is, the sorting label is 0.

Based on the three formalized rules, a program is designed to automatically construct the labeled training set L.

Step 2: An answer sorting model is constructed based on the CQA-CNN model and the sorting relationship between any two candidate answers is trained and predicted.

The answer sorting model in step S2 is constructed based on the CQA-CNN model of two shared parameters and a fully connected layer, and the text features and community features related to the target questions and two candidate question-answer pairs are input. Firstly, the model forms the input target questions and two candidate question-answer pairs into two question-answer triples, and inputs the text features and community features related to the triples into the CQA-CNN model of two shared parameters to obtain feature representations of the question-answer data of the two triples; then, the feature representations of the triples of the question-answer data learned by the CQA-CNN model are input into the fully connected layer, a correlation score between the target questions and the candidate question-answer pairs is obtained through nonlinear mapping, and a final sorting label is output according to the correlation score between the target questions and the two candidate question-answer pairs; when the output is 1, it means that a first candidate question-answer pair ranks higher than a second candidate question-answer pair in the final sorting; when the output is −1, the result is opposite.

A loss function of the answer sorting model consists of a hinge loss function, a parameter regularization term and a penalty term as follows:

$$L(\Phi, \lambda, \mu) = \sum_{i=1}^{N}[1 - y_i[F(t_i) - F(t_i')]]_+ + \lambda \|\Phi\|_1 + \mu \sum_{j=1}^{M} |F(u_j) - F(u_j')| \tag{11}$$

where $t_i$ and $t_i'$ represent related feature sets of the question-answer triples with sorting labels of 1 and −1; $u_j$ and $u_j'$ represent related feature sets of the question-answer triples with a sorting label of 0; $F(t_i)$ indicates a correlation score obtained by inputting $t_i$ into the fully connected layer after being represented by CQA-CNN; $y_i$ indicates a sorting label expected by the candidate question-answer pair; $\Phi$ indicates all the parameters in the answer ordering model, including the parameters in the CQA-CNN model and the fully connected layer; $\lambda$ and $\mu$ indicate t sup parameter of an answer sorting algorithm, $\lambda=0.05$, $\mu=0.01$.

Step 3, an unlabeled sample set is constructed, additional samples are selected from the set for manual labeling in combination with active learning, and are merged into the labeled training set to further train the answer sorting model.

The unlabeled training set is constructed according to an actual research goal, and for the target questions, a k-NN algorithm is used to search several similar questions in the data set based on an open source graph computing framework GraphLab; then, a candidate question-answer pair set of the target questions is constructed by using the similar questions and all answers to the similar questions; finally, two candidate question-answer pairs are selected each time from the candidate question-answer pair set of the target questions in a non-repetitive manner, and the target questions and the two candidate question-answer pairs are respectively formed into two triples, so that a triple pair formed by the two triples are a sample in the unlabeled training set.

In addition to automatically constructing the labeled training set, active learning is applied to the answer sorting algorithm, and according to the query function, the unlabeled samples which are most helpful to improve the performance of the answer sorting model are specifically selected in the unlabeled training set to be labeled and used for model training.

The query function first measures a difference between the correlation scores of two candidate question-answer pairs based on an information entropy; the smaller the difference, the larger the information entropy, and the greater the inaccuracy of the prediction results of the model; a specific calculation formula is as follows:

$$e(TT_i')=p_{TT_i'} \cdot \log p_{TT_i'} + (1-p_{TT_i'}) \cdot \log(1-p_{TT_i'}) \tag{12}$$

$$p_{TT_i'}=f(rscore(t_i)-rscore(t_i')) \tag{13}$$

where $p_{TT_i'}$ indicates the probability that the sorting labels of the triples $t_i$ and $t_i'$ are 1; f indicates a sigmoid function; $rscore(t_i)$ indicates the correlation score of the triple $t_i$ obtained by the answer sorting model.

In addition, considering the similarity of high-quality answers to similar questions in community question-answer website, the query function also considers the similarity between candidate answers when selecting samples, and the final query function is as follows:

$$q(TT_i')=e(TT_i')+\beta \cdot sim(a_i,a_i') \tag{14}$$

where $a_i$ and $a_i'$ indicate text feature matrices representing two candidate answers; sim indicates a cosine similarity; a parameter $\beta$ determines and coordinates the influence of the similarity of the candidate answers on a final query score, $\beta=0.1$.

The sum of the labeling scores of samples with the same target question is taken as the labeling score of the target question, which is calculated as follows:

$$q(query_i) = \sum_{k=0}^{m_i-1} q(TT'_k) = \sum_{k=0}^{m-1} e(TT'_k) + \beta \cdot sim(a_k, a'_k) \quad (15)$$

where $m_i$ indicates the number of question-answer triples under a target question $query_i$.

At the same time, the application provides a community question-answer website answer sorting system combined with active learning, including:

A question-answer data representation module used for extracting text features of the question-answer data, and expressing a question title and answer content after word segmentation and stop word removal as a word vector matrix; calculating a community feature of the question-answer data based on community data related to question-answer, mapping a total number of approval answers to a question and a number of user answers to (0,1) through a question long tail factor and a user long tail factor, multiplying the community feature of the question-answer data by the question long tail factor and the user long tail factor to replace an original community feature of the question-answer data, and inputting the community feature of the question-answer data into a CQA-CNN model to represent the question-answer data as a distributed vector.

A training set construction and answer sorting module used for performing statistical analysis on a question-answer data set, formalizing a statistical result into rules, and automatically constructing a preliminary labeled training set based on the rules; constructing a answer sorting model based on the CQA-CNN model, and predicting a sorting relationship between any two candidate answers; constructing an unlabeled training set, and selecting an additional sample from the unlabeled training set for manual labeling by combining active learning; merging labeled results into the preliminary labeled training set to retrain the answer sorting model, and using the answer sorting model after retraining for community question-answer website answer sorting.

The steps of the method or algorithm described combined with the embodiments of the present disclosure may be implemented in a hardware manner, or may be implemented in a manner in which a processor executes software instructions. The software instructions may consist of corresponding software modules, and the software modules can be stored in Random Access Memory (RAM), flash memory, Read Only Memory (ROM), Erasable Programmable ROM (EPROM), Electrically Erasable Programmable Read-Only Memory (EEPROM), registers, hard disks, removable hard disks, CD-ROMs or any other forms of storage media well-known in the art. An exemplary storage medium is coupled to the processor, such that the processor can read information from, and write information to, the storage medium. The storage medium can also be an integral part of the processor. The processor and storage medium may reside in an Application Specific Integrated Circuit (ASIC). Alternatively, the ASIC may be located in a node device, such as the processing node described above. In addition, the processor and storage medium may also exist in the node device as discrete components.

It should be noted that when the data compression apparatus provided in the foregoing embodiment performs data compression, division into the foregoing functional modules is used only as an example for description. In an actual application, the foregoing functions can be allocated to and implemented by different functional modules based on a requirement, that is, an inner structure of the apparatus is divided into different functional modules, to implement all or some of the functions described above. For details about a specific implementation process, refer to the method embodiment. Details are not described herein again.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a server or a terminal, all or some of the procedures or functions according to the embodiments of this application are generated. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a server or a terminal, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive).

The above description is only a preferred embodiment of the present disclosure, and it is not intended to limit the technical solution of the present disclosure. It should be understood by those skilled in the art that the technical solution can be modified and replaced in a number of simple ways without departing from the spirit and principle of the present disclosure, and all these modifications and substitutions are within the scope of protection covered by the claims.

What is claimed is:

1. A community question-answer website answer sorting method combined with active learning, comprising the following steps: Step 1, question-answer data representation and modeling: firstly, extracting text features of question-answer data, and expressing a question title and answer content after word segmentation and stop word removal as a word vector matrix; then, calculating a community feature of the question-answer data based on community data related to question-answer, mapping a total number of approval answers to a question and a number of user answers to (0,1) through a question long tail factor and a user long tail factor, multiplying the community feature of the question-answer data by the question long tail factor and the user long tail factor to replace an original community feature of the question-answer data; and finally, inputting the community feature of the question-answer data into a CQA-CNN model to represent the question-answer data as a distributed vector; Step 2, constructing a training set by combining active learning and predicting a sorting relationship of candidate question-answer pairs: firstly, performing statistical analysis on a question-answer data set, formalizing a statistical result into rules, and automatically constructing a preliminary labeled training set based on the rules; then, constructing an answer sorting model based on the Community Question Answering-Convolutional Neural Network (CQA-CNN) model, and predicting a sorting relationship between any two candidate answers; finally, constructing an unlabeled training set, and selecting an additional sample from the unlabeled training set for manual labeling by combining active learning; merging labeled results into the preliminary labeled training set to retrain the answer sorting model, and using the answer sorting model after retraining for community question-answer website answer sorting.

2. The community question-answer web site answer sorting method combined with active learning according to claim 1, wherein in step 1, a title of a target question, the content of a candidate answer and a title of an original question corresponding to the candidate answer in the question-answer data are subjected to segmentation and stop word removal, and then texts are respectively expressed as word vector matrices by word2vec.

3. The community question-answer website answer sorting method combined with active learning according to claim 1, wherein the community data related to question-answer in step 1 comprise a number of question answers, a proportion of approvals to an answer, a number of user answers, an average number of user approvals, an average number of user likes, an average number of user answer collections and a number of user followers; the number of question answers refers to a total number of answers to a question, the number of user answers refers to a total number of answers provided by users in the website, and the number of user followers refers to a total number of people who follows a user; the proportion of approvals to an answer refers to a proportion of the number of approvals to the answer in a total number of all approvals to answers to the question; the proportion of approvals to an answer is calculated as follows:

$$avp_i^j = \frac{av_i^j}{\sum_{j=1}^{m_i} av_i^j}$$

where: $avp_i^j$ indicates an approval proportion of an answer $a_i^j$; $av_i^j$ indicates the number of approvals to the answer $a_i^j$:

$$\sum_{j=1}^{m_i} av_i^j$$

indicates the sum of approvals of all answers to a question $q_i$; $m_i$ indicates the total number of answers to the question $q_i$;

the average number of user approvals, the average number of user likes and the average number of user answer collections respectively refer to the number of approvals, likes and collections of each answer of a user on average, which are calculated as follows:

$$uva_i = \frac{uvc_i}{uac_i}$$

$$ula_i = \frac{ulc_i}{uac_i}$$

$$uca_i = \frac{ucc_i}{uac_i}$$

where $uac_i$ indicates the number of answers of a user $u_i$; $uvc_i$ indicates the total number of approvals to all answers of the user $u_i$, that is, the number of approvals of the user; $ula_i$ indicates the average number of likes of the user $u_i$; $ulc_i$ indicates the sum of likes obtained by all the answers of the user $u_i$, that is, the number of likes of the user.

4. The community question-answer web site answer sorting method combined with active learning according to claim 1, wherein the question long tail factor and the user long tail factor in step 1 are calculated as follows:

$$q\_factor = \frac{1}{1 + e^{-(\omega_q \cdot qv_i - \phi_q)}}$$

$$u\_factor = \frac{1}{1 + e^{-(\omega_u \cdot uac_i - \phi_u)}}$$

where $qv_i$ indicates the sum of approvals to all the answers to the question $q_i$, that is $$qv_i = \sum_{j=1}^{m_i} av_i^j;$$

$m_i$ is the total number of answers to a question; $\omega_q=0.1$, $\phi_q=0.6$ both represent calculation parameters of the question long tail factor;
$uac_i$ indicates the number of answers of the user $u_i$; $\omega_u=0.1$, $\phi_u=1$ both represent calculation parameters of the user long tail factor.

5. The community question-answer website answer sorting method combined with active learning according to claim 1, wherein a structure of the CQA-CNN model in step 1 comprises a deep network for target questions, a deep network for candidate answers, and an attention mechanism module and a feature connection layer between the two deep networks; the deep network for target questions comprises two convolution layers and two pooling layers, and the deep network for candidate answers comprises three convolution layers and three pooling layers; two attention mechanism modules are respectively introduced into the CQA-CNN model before the two deep networks and between the two pooling layers, and finally high-level semantic features of target questions, high-level semantic features of candidate answers, community features and similarity features of the target questions and the candidate answers corresponding to original questions that are obtained from learning are connected in a feature connection layer, so as to obtain a representation of the question-answer data of a CQA website.

6. The community question-answer web site answer sorting method combined with active learning according to claim 5, wherein, in the convolution layers, the CQA-CNN model adopts wide convolution to extract the semantic features of several consecutive words; in the pooling layers, the CQA-CNN model adopts two pooling strategies, i.e., partial pooling is adopted by the QA-CNN model for a middle pooling layer, that is, average pooling is implemented for features in a window of a certain length, and complete pooling is adopted by the QA-CNN model for the last pooling layer in the network, that is, average pooling is implemented for convolution results in a sentence length dimension; the attention mechanism module calculates an attention weight based on feature maps output by the convolution layers of the two deep models, and applies results to the pooling layers for weighted pooling; for the feature maps F.sub.q.sup.c and F.sub.q.sup.c obtained by the convolution layers of the text features of the target questions and candidate answers, an attention matrix A is calculated as follows:

$$A_{i,j} = \frac{1}{1 + |F_q^c[:,i] - F_a^c[:,j]|}$$

where |•| represents a Euclidean distance;
in the attention matrix A, a sum of elements in each row and column is a weight of words; the feature connection layer merges features including the high-level semantic features of target question texts, the high-level semantic features of candidate answer texts, community features related to the question-answer data, and cosine similarities of feature matrices of original question texts of the target questions and candidate answers, and finally, the question-answer data is represented as a distributed vector by the QA-CNN model.

7. The community question-answer web site answer sorting method combined with active learning according to claim 1, wherein: in step 2, after the statistical analysis on the question-answer data set, three rules are obtained and formalized; firstly, in the CQA web site, under a same question, optimal answers are ranked higher than non-optimal answers; secondly, in the CQA web site, under the same question, there is no difference in sorting order between non-optimal answers; and finally, in the CQA website, the answers to questions in a same field as the target questions are ranked higher than those to questions in a different field from the target questions; the above three rules are formalized as follows:

$(q_i,(q_j,a_i^l)) \succ (q_i,(q_j,a_i^m))$ $(q_i,(q_j,a_i^n)) \cong (q_i,(q_j,a_i^m))$ $(q_i,(q_j,a_j^n)) \succ (q_i,(q_k,a_i^m))$ where m≠l, n≠m, and the symbol ≻ indicates that for the target question $q_i$, a candidate question-answer pair ($q_i$, $a_i^l$) is ranked higher than a candidate question-answer pit ($q_i$, $a_i^m$), that is, a sorting label is 1, and the symbol ≅ indicates that for the target question $q_i$, there is no sorting relationship between the candidate question-answer pair ($q_i$, $a_i^n$) and the candidate question-answer pair ($q_i$, $a_i^m$), that is, the sorting label is 0;

a program is designed to automatically construct the labeled training set L based on the three formalized rules.

8. The community question-answer website answer sorting method combined with active learning according to claim 1, wherein the answer sorting model in step 2 is constructed based on the CQA-CNN model of two shared parameters and a fully connected layer, and the text features and community features related to the target questions and two candidate question-answer pairs are input; firstly, the model forms the input target questions and two candidate question-answer pairs into two question-answer triples, and inputs the text features and community features related to the triples into the CQA-CNN model of two shared parameters to obtain feature representations of the question-answer data of the two triples; then, the feature representations of the triples of the question-answer data learned by the CQA-CNN model are input into the fully connected layer, a correlation score between the target questions and the candidate question-answer pairs is obtained through nonlinear mapping, and a final sorting label is output according to the correlation score between the target questions and the two candidate question-answer pairs; when the output is 1, it means that a first candidate question-answer pair ranks higher than a second candidate question-answer pair in the final sorting; and when the output is −1, the result is opposite; and a loss function of the answer sorting model consists of a hinge loss function, a parameter regularization term and a penalty term as follows:

$$L(\Phi, \lambda, \mu) = \sum_{i=1}^{N} [1 - y_i[F(t_i) - F(t_i')]]_+ + \lambda \|\Phi\|_1 + \mu \sum_{j=1}^{M} |F(u_j) - F(u_j')|$$

where $t_i$ and $t_i'$ represent related feature sets of the question-answer triples with sorting labels of 1 and −1; $u_j$ and $u_j'$ represent related feature sets of the question-answer triples with a sorting label of 0; $F(t_j)$ indicates a correlation score obtained by inputting $t_i$ into the fully connected layer after being represented by CQA-CNN; $y_i$ indicates a sorting label expected by the candidate question-answer pair; $\Phi$ indicates all the parameters in the answer ordering model, including the parameters in the CQA-CNN model and the fully connected layer; λ and μ indicate t sup parameter of an answer sorting algorithm, λ=0.05, μ=0.01.

9. The community question-answer web site answer sorting method combined with active learning according to claim 1, wherein in step 2, the unlabeled training set is constructed according to an actual research goal, and for the target questions, a k-NN algorithm is used to search several similar questions in the data set based on an open source graph computing framework GraphLab; then, a candidate question-answer pair set of the target questions is constructed by using the similar questions and all answers to the similar questions; finally, two candidate question-answer pairs are selected each time from the candidate question-answer pair set of the target questions in a non-repetitive manner, and the target questions and the two candidate question-answer pairs are respectively formed into two triples, so that a triple pair formed by the two triples are a sample in the unlabeled training set; in addition to automatically constructing the labeled training set, active learning is applied to the answer sorting algorithm, and according to the query function, the unlabeled samples which are most helpful to improve the performance of the answer sorting model are specifically selected in the unlabeled training set to be labeled and used for model training; the query function first measures a difference between the correlation scores of two candidate question-answer pairs based on an information entropy; the smaller the difference, the larger the information entropy, and the greater the inaccuracy of the prediction results of the model; a specific calculation formula is as follows:

$$e(TT_i')=p_{TT_i'}\cdot \log p_{TT_i'}+(1-p_{TT_i'})\cdot \log(1-p_{TT_i'})$$

$$p_{TT_i'}=f(rscore(t_i)-rscore(t_i'))$$

where $p_{TT_i'}$ indicates the probability that the sorting labels of the triples $t_i$ and $t_i'$ are 1; f indicates a sigmoid function; $rscore(t_i)$ indicates the correlation score of the triple $t_i$ obtained by the answer sorting model;

the query function selects samples based on the similarity between candidate answers, and the final query function is as follows:

$$q(TT_i')=e(TT_i')+\beta\cdot sim(a_i,a_i')$$

where $a_i$ and $a_i'$ indicate text feature matrices representing two candidate answers; sim indicates a cosine similarity; a parameter $\beta$ determines and coordinates the influence of the similarity of the candidate answers on a final query score, $\beta=0.1$;

a sum of the labeling scores of samples with the same target question is taken as the labeling score of the target question, which is calculated as follows:

$$q(query_i) = \sum_{k=0}^{m_i-1} q(TT_k') = \sum_{k=0}^{m-1} e(TT_k') + \beta\cdot sim(a_k, a_k')$$

where $m_i$ indicates the number of question-answer triples under a target question $query_i$.

10. A community question-answer website answer sorting system combined with active learning, comprising: a memory; a processor; a question-answer data representation module configured for extracting text features of the question-answer data, and expressing a question title and answer content after word segmentation and stop word removal as a word vector matrix; calculating a community feature of the question-answer data based on community data related to question-answer, mapping a total number of approval answers to a question and a number of user answers to (0,1) through a question long tail factor and a user long tail factor, multiplying the community feature of the question-answer data by the question long tail factor and the user long tail factor to replace an original community feature of the question-answer data, and inputting the community feature of the question-answer data into a Community Question Answering-Convolutional Neural Network (CQA-CNN) model to represent the question-answer data as a distributed vector; a training set construction and answer sorting module configured for performing statistical analysis on a question-answer data set, formalizing a statistical result into rules, and automatically constructing a preliminary labeled training set based on the rules; constructing a answer sorting model based on the CQA-CNN model, and predicting a sorting relationship between any two candidate answers; constructing an unlabeled training set, and selecting an additional sample from the unlabeled training set for manual labeling by combining active learning; merging labeled results into the preliminary labeled training set to retrain the answer sorting model, and using the answer sorting model after retraining for community question-answer website answer sorting.

\* \* \* \* \*